United States Patent [19]
Futamata et al.

[11] Patent Number: 5,100,189
[45] Date of Patent: Mar. 31, 1992

[54] STRUCTURE FOR ABSORBING COLLISION IMPACT

[75] Inventors: Tatsuya Futamata; Hitoshi Kawatoko, both of Kanagawa, Japan

[73] Assignee: Nissan Motor Company, Limited, Kanagawa, Japan

[21] Appl. No.: 542,557

[22] Filed: Jun. 25, 1990

[30] Foreign Application Priority Data

Jun. 22, 1989 [JP] Japan ................................. 1-160096

[51] Int. Cl.$^5$ .............................................. B60K 19/34
[52] U.S. Cl. ..................................... 293/132; 296/189
[58] Field of Search ................. 293/132; 296/189, 188

[56] References Cited

U.S. PATENT DOCUMENTS

| | | | |
|---|---|---|---|
| 1,669,140 | 5/1928 | Ohlendorf | 293/132 X |
| 4,465,312 | 8/1984 | Werner | 293/132 |
| 4,679,837 | 7/1987 | Bayer et al. | 293/132 X |
| 4,778,208 | 10/1988 | Lehr et al. | 296/189 X |
| 4,950,031 | 8/1990 | Mizunaga et al. | 296/195 X |

FOREIGN PATENT DOCUMENTS

149839   9/1983   Japan ................................. 293/132

*Primary Examiner*—Margaret A. Focarino
*Assistant Examiner*—Gary C. Hoge
*Attorney, Agent, or Firm*—Pennie & Edmonds

[57] ABSTRACT

A bumper structure for absorbing a collision impact having a bumper, a bumper stay supporting the bumper component and a side member supporting the bumper stay via a bolts so as to be offset horizontally and downwardly relative to the bumper stay. The side member has a weakened portion opposite the mounting connection of the side member to the bumper stay, and has an extended portion extending from an end of the side member. The positions of the bumper stay, weakened area, and extended portion being such that the torque transferred to the weakened portion via the securing means is substantially equal and opposite to the torque transferred to the weakened portion via the extending portion, such that the side member is crushed into accordion-like pleats in the longitudinal direction to progressively absorb the impact.

6 Claims, 3 Drawing Sheets

ENERGY ABSORPTION OF
THE STRUCTURE

STRUCTURE FOR ABSORBING COLLISION IMPACT

BACKGROUND OF THE INVENTION

1. Field of the Invention

The present invention relates to a structure for absorbing collision impact for an automotive vehicle.

2. Disclosure of Background Art

Generally, a structure for absorbing collision impact for an automotive vehicle is composed of a bumper comprising a bumper armature, a bumper fascia and an energy absorbing material, a closing plate attached to a side member of a vehicle body which is hat-shaped in cross-section. and a bumper stay extended from the bumper and secured to a flange connecting portion positioned in front of the closing plate via springs.

Japanese Utility Mode First publication (Jikkai) NO. 62-123462 discloses a structure for absorbing collision impact having a composition as mentioned above. However, as shown in FIG. 1, in this structure, the bumper stay is secured to an outer side of the side member so as to be outwardly offset from and parallel to the side member because the bumper is mounted after body assembling. Therefore, a bending force may be momentarily input to the side member (and the closing plate attached to the side member) through the bumper stay if the bumper is subjected to an impact from a direction perpendicular to the surface of the bumper fascia. As shown in FIG. 2, this force may easily bend the side member and deform it inwardy toward the body when a large impact force such as a collision is encountered by the bumper.

Generally, the energy absorption of materials bent in one direction is not very high. Therefore, when the vehicle is subjected to a collision, the inward bend, the inwardly bent of the side member of the body cannot absorb the collision energy sufficiently. To prevent bending of the side member in the above arrangement, elaborate reinforcement of the member is necessary. This increases manufacturing steps and costs.

SUMMARY OF THE INVENTION

It is therefore, the principal object of the present invention to provide a structure having excellent collision energy absorption.

It is another object of the present invention to provide a structure for absorbing collision impact having a side member which cannot bend inwardly, or in only one direction.

It is an additional object of the present invention to provide a structure for absorbing collision impact having portions which progressively absorb the energy over a relatively long distance in the longitudinal direction of the side member.

It is a further object of the present invention to provide a structure for absorbing collision impact having a simple structure which can be manufactured easily at substantially reduced cost.

The present invention comprises a bumper component for providing a cushioning effect while receiving collision impact; a bumper stay connected to said bumper component; a side member connected to said bumper stay via a securing means so as to be offset horizontally and downwardly relative to said bumper stay, having a weakened portion at a first predetermined position relative to a mounting connection of said side member to said securing means, and having an extended portion extending in the longitudinal direction of said side member from a second predetermined position of said side member relative to said first predetermined position, wherein said first predetermined position and said second predetermined position and said mounting connection have a relative positioning such that the torque transferred to the weakened portion via the securing means is substantially equal and opposite to the torque transferred to the weakened portion via the extending portion whereby said side member is crushed into accordion-like pleats in the longitudinal direction of the side member from an end toward an opposite end thereof to transfer said impact to progressively absorb said impact.

The weakened portion may be formed on the side member at a side opposite that to which the bumper stay is attached.

The side member may be reinforced by a reinforcing means at an essentially inner surface thereof, the reinforcing means including at least one cut away portion to essentially surround the weakened portion formed on the side member. The reinforcing means may be formed so as to enlarge in cross section from an end of the side member proximate to the bumper to a central portion of the side member to provide reinforcement to the central portion of the side member. Alternatively, the reinforcing means may be formed so as to leave at least one unreinforced portion on the side member. The side member may be unreinforced at a side opposite to which the second component is attached.

The side member may include an extended portion extending in the longitudinal direction of the to side member the bumper to provide the energy absorption according to the collision impact.

According to the present invention, once impact of sufficient force is input to the side member through the bumper stay, the bumper starts to bend inwardly toward the body by the bending force provided from the input portion of the bumper stay. Concurrently, the weakened portion positioned essentially opposite portion attached to the bumper stay to disperse the impact starts to bend similarly but in the opposite direction. Therefore, the bending force acts on the weakened portion in the longitudinal direction thereof. As a result, the weakened portion is crushed progressively from its edge to its center portion, like accordion pleats, during collision impact. Thus, since the impact energy applied to the structure is dispersed over a relatively long distance in the longitudinal direction of the weakened portion, it can be absorbed progressively and substantially.

BRIEF DESCRIPTION OF THE DRAWINGS

The present invention will be understood more fully from the detailed description given hereinbelow and the appended drawings of the preferred embodiments according to the present invention, which are given by way of example only, and are not intended to be imitative of the present invention.

In the drawings.

DETAILED DESCRIPTION OF THE PREFERRED EMBODIMENT

Figure 3:
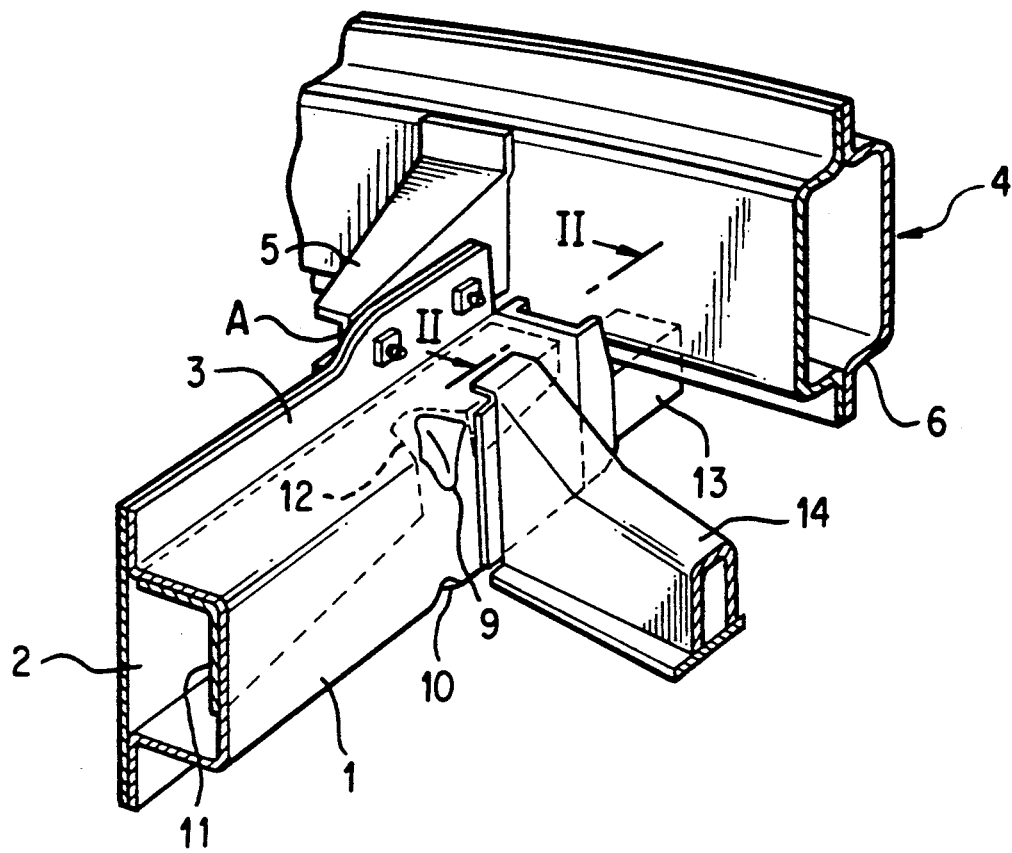
FIG. 3 is a perspective view of a structure for absorbing collision impact according to the present invention.

Referring now to FIG. 3, the numeral 1 generally designates a side member having a hat-shaped cross section, an opening surface thereof being attached to a closing plate 2. The side member 1 and the attached closing plate 2 extend along the longitudinal direction of the automotive vehicle body. A flange connecting portion 3 is formed at an upper edge area of the side member and the attached closing member. A bumper 4 is composed of a bumper fascia (not shown in the drawings), a bumper armature 6, and an energy absorbing material (not shown in the drawings) stuffed in the bumper armature 6. A bumper stay 5 is extended from the inner surface of the bumper armature 6 perpendicularly, and secured by bolts to the flange connecting portion 3 of the side member 1 so as to be outwardly offset parallel to the direction in which side member 1 extends.

At a portion opposite the portion A where the bumper stay 5 is attached to the side member: weakened portions 9 and 10 are forced on the side member 1 in order to disperse the impact force. These weakened portions 9 and 10 are formed of upper and lower cut out portions in the side member 1, and are formed so as to bend outward when the bumper 4 receives a large impact from a direction perpendicular to its surface. The side member 1 is reinforced by attaching a reinforcement portion 11 within the hollow inner portion of the side member 1. The reinforcement 11 is formed such that its cross section is gradually enlarged from the edge where it is attached to the bumper stay 5 to the center of the side member's length. According to this structure, impact input from the bumper 4 cannot easily bend the center portion of the side member 1. On the reinforcement 11, an additional weakened portion 12 is formed corresponding to the weakened portion 9 so as to essentially surround the weakend portion 9. This causes the side member 1 to bend outwardly of the body more easily.

Figure 4:
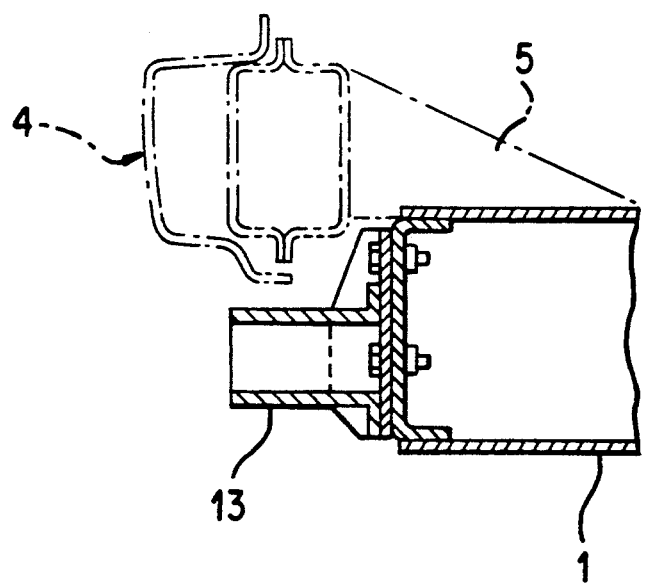
FIG. 4 is a sectional view along the line II—II of the FIG. 1.

Referring now to FIGS. 3 and 4, at the forward peripheral edge of the side member 1, an extending portion 13 is extended from the side member 1. The extended portion 13 receives the impact directly when the bumper 4 is deformed by the impact and transfers it to the forward edge of the side member 1.

Though the structures shown in FIGS. 3 to 4 are only partial structures, other bumper mounting portions are also formed similar to the previously mentioned. A left side member and right side member are connected via a cross member 14.

Figure 5:
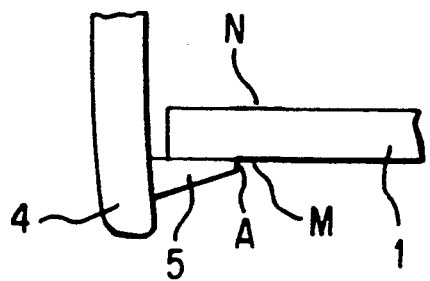
FIG. 5 is a plan view of the present invention.
Figure 6:
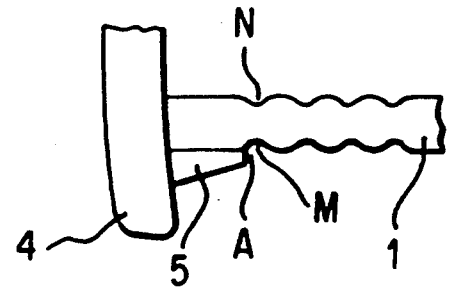
FIG. 6 is a plan view showing the present invention under impact.

In FIGS. 4 to 6, the structure for absorbing collision impact as previously mentioned, while receiving impact such as collision, operates as follows:

The impact energy applied to the bumper 4 is transferred to the bumper stay 5 through the bumper fascia and the bumper armature. Then the impact energy reaches the portion A of the bumper stay 5 where the bumper stay is attached to the side member, and from there is input to the point M of side member 1 from the side, in a direction perpendicular to the initial impact, as momentary bending force. The bending force acts to bend the side member 1 at the point M in a direction opposite the sideways force transferred from the point A. Concurrently with the above, the impact is also transferred to the side member 1 directly through the extended portion 13 to act on the weakened portions 9, 10 and 12 to bend the side member 1 at the point N in the direction of the point M, that is, in the same direction from which the sideways force from the bumper stay 5 is applied impact. Thus, the impact is input as momentary bending forces having equal magnitude but opposite directions, to both sides of the member 1 at a point around the attached portion 5, the point M, the weakened portions 9, 10 and 12, and the point N. Therefore, bending in one direction only will not occur. The side member 1 which is subjected to impact is pressed at the points M and N concurrently then crushed. Then, the impact transfers progressively from the edge to the center portion of the side member 1, the side member 1 absorbing the impact energy substantially by crushing like accordion pleats in the longitudinal direction of the member 1.

Figure 1:
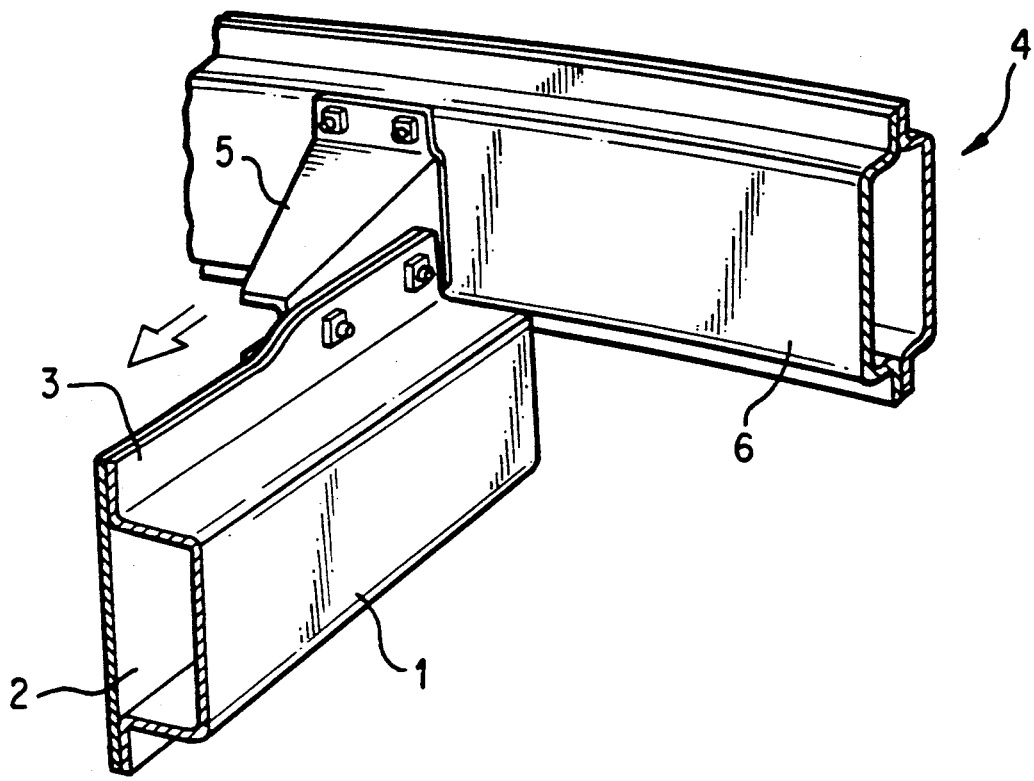
FIG. 1 is a perspective view of a structure for absorbing collision impact of the prior art.
Figure 2:
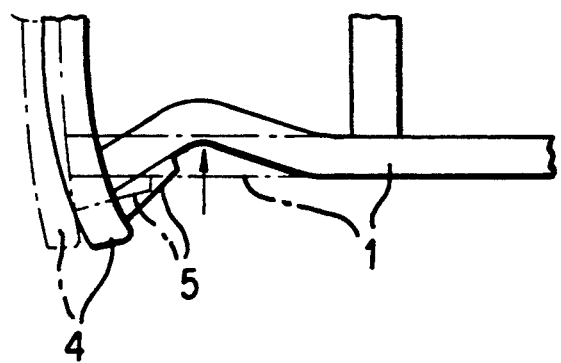
FIG. 2 is a plan view of the prior art bumper of FIG. 1 under impact conditions.
Figure 7:
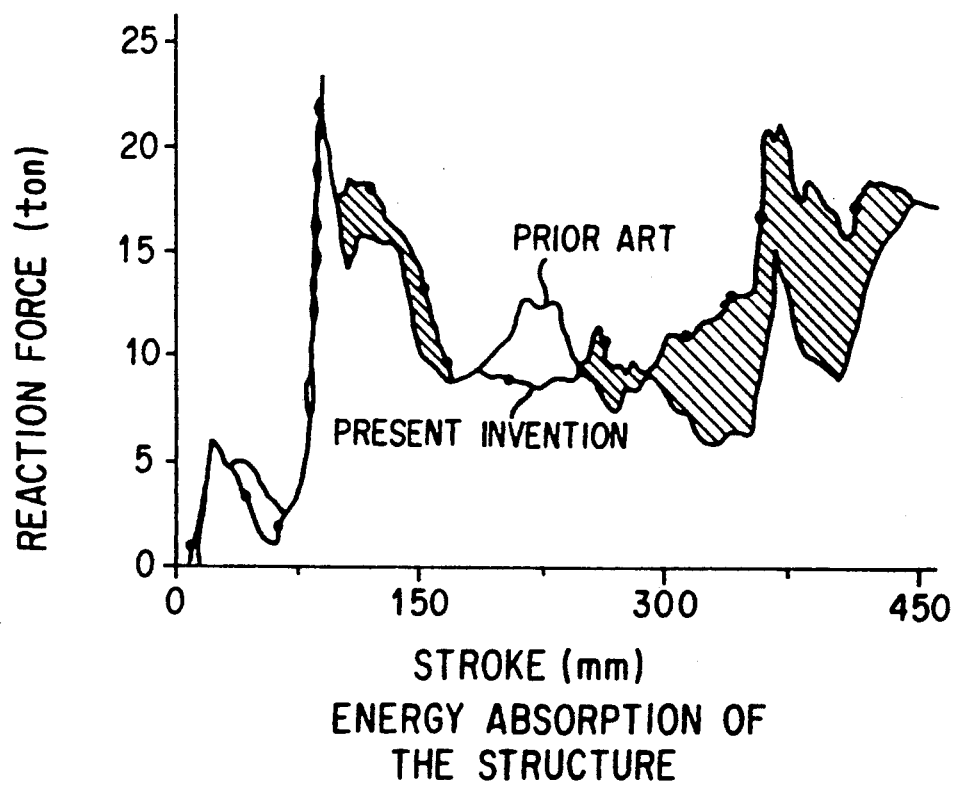
FIG. 7 is a graph showing the energy absorbing characteristics of the invention as compared with the prior art.

The comparative energy absorption of the structure for absorbing collision impact of the present invention was examined relative that of the prior art. The abovementioned structures for absorbing collision impact were constructed as shown in FIGS. 3 and 1, respectively. Impact force was applied to the bumper fascia. At appropriate times the reaction force, which indicates the energy absorption level, of both arrangements was measured. The obtained relationship between energy absorption and impact stroke are shown in FIG. 7. The results show that the structure of the present invention absorbs impact energy to a greater degree than the prior art as indicated by the biased area of FIG. 7.

According to the present invention, once impact of sufficient force is input to the side member 1 through the bumper stay 5, the side member 1 starts to bend inwardly toward the body by the bending force provided from the input portion of the bumper stay 5. Concurrently, the weakened portions positioned essentially opposite the portion attached to the bumper bumper stay 5 starts to bend similarly but in the opposite direction. Therefore, the bending force acts on the side member 1 in the longitudinal direction of the side member 1. As a result, the side member 1 is crushed progressively from the edge to the center potion of the member 1, like accordion pleats, during collision. Thus, since the impact energy applied to the bumper is dispersed over a relatively long distance in the longitudinal direction of the side member 1, it can be absorbed progressively and substantially.

Although the preferred embodiment of the present invention have been illustrated and described, other changes will occur to those skilled in the art. It is therefore intended that the present invention is to be limited only by the scope of the appended claims. For example, the weakened portions formed on the side member are not limited to three, but individual or independently formed compositions of 2 or 3 weakened portions, positioned appropriately may be also preferred. Additionally, the reinforcement attached to the interior of the side member may alternatively be formed separately to remain one or more of unreinforced portions. Furthermore, a side member having an integral structure (that is with no closing plate) may be preferred.

What is claimed is:

1. A structure for absorbing collision impact comprising:

a bumper component for providing a cushioning effect while receiving collision impact;

a bumper stay connected to said bumper component;

a side member connected to said bumper stay component via a securing means so as to be offset horizontally and downwardly relative to said bumper stay, having a weakened portion at a first predetermined position relative to a mounting connection of said side member to said securing means, and having an extended portion extending in the longitudinal direction of said side member from a second predetermined position of said side member relative to said first predetermined position, wherein said first predetermined position and said second predetermined position and said mounting connection have a relative positioning such that the torque transferred to said weakened portion via said securing means is substantially equal and opposite to the torque transferred to said weakened portion via said extending portion, whereby said side member is crushed into accordion-like pleats in the longitudinal direction of the side member from an end toward an opposite end thereof to transfer said impact to progressively absorb said impact.

2. The structure as set forth in claim 1, wherein said weakened portion is formed on said side member at a side opposite that to which said bumper stay is attached.

3. The structure as set forth in claim 1, wherein said side member is reinforced by a reinforcing means at an essentially inner surface thereof, said reinforcing means including at least one cut away portion to essentially surround said weakened portion associated with said side member.

4. The structure as set forth in claim 3, wherein said reinforcing means is formed so as to enlarge in cross section from an end of said side member proximate to said bumper component toward an opposite end of said side member to provide reinforcement to a portion of said side member toward said opposite end thereof.

5. The structure as set forth in claim 3, wherein said reinforcing means is formed so as to leave at least one unreinforced portion on said side member.

6. The structure as set forth in claim 1, wherein said weakened portion and said bumper stay are formed on a opposite sides of said side member relative to each other and said extended portion is mounted to a front of said side member.

* * * * *